(No Model.) 2 Sheets—Sheet 2.

R. K. SWIFT.
DISK CULTIVATOR.

No. 460,515. Patented Sept. 29, 1891.

Witnesses
C. C. Burdine
Geo. S. Haycock

Inventor
R. K. Swift
By his Attorney
John G. Manahan
Atty

UNITED STATES PATENT OFFICE.

R. K. SWIFT, OF STERLING, ILLINOIS, ASSIGNOR TO THE EMPIRE MANUFACTURING COMPANY, OF KEOKUK, IOWA..

DISK CULTIVATOR.

SPECIFICATION forming part of Letters Patent No. 460,515, dated September 29, 1891.

Application filed May 28, 1890. Serial No. 353,504. (No model.)

*To all whom it may concern:*

Be it known that I, R. K. SWIFT, a citizen of the United States, residing at Sterling, in the county of Whiteside and State of Illinois, have invented certain new and useful Improvements in Disk Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in disk cultivators which are constituted of two independent disk gangs adapted, respectively, to coincidently operate on opposite sides of the row of corn straddled by the implement.

The present application has reference to improvements upon the machine for which Letters Patent No. 379,295 were granted to me March 13, 1888, so as to further increase the efficiency of the machine.

The objects of my present improvements are, first, to disconnect each gang from the other, and thus render each susceptible of independent movement to and from the center of the machine; second, to secure an independent vertical adjustment to each gang; third, to provide means for laterally rocking each gang, so as to regulate the angle of the latter with the surface of the ground; fourth, to supplement the weight of each gang with a spring-pressure where the density of the earth is such as to require a pressure upon the gangs additional to that which is afforded by their own weight, and, fifth, to provide means for coincidently changing and adjusting the angle of both gangs to the line of movement of the machine, so as to regulate the depth of cut and quantity of earth moved. I attain these objects by the mechanism illustrated in the accompanying drawings, in which—

Figure 1:
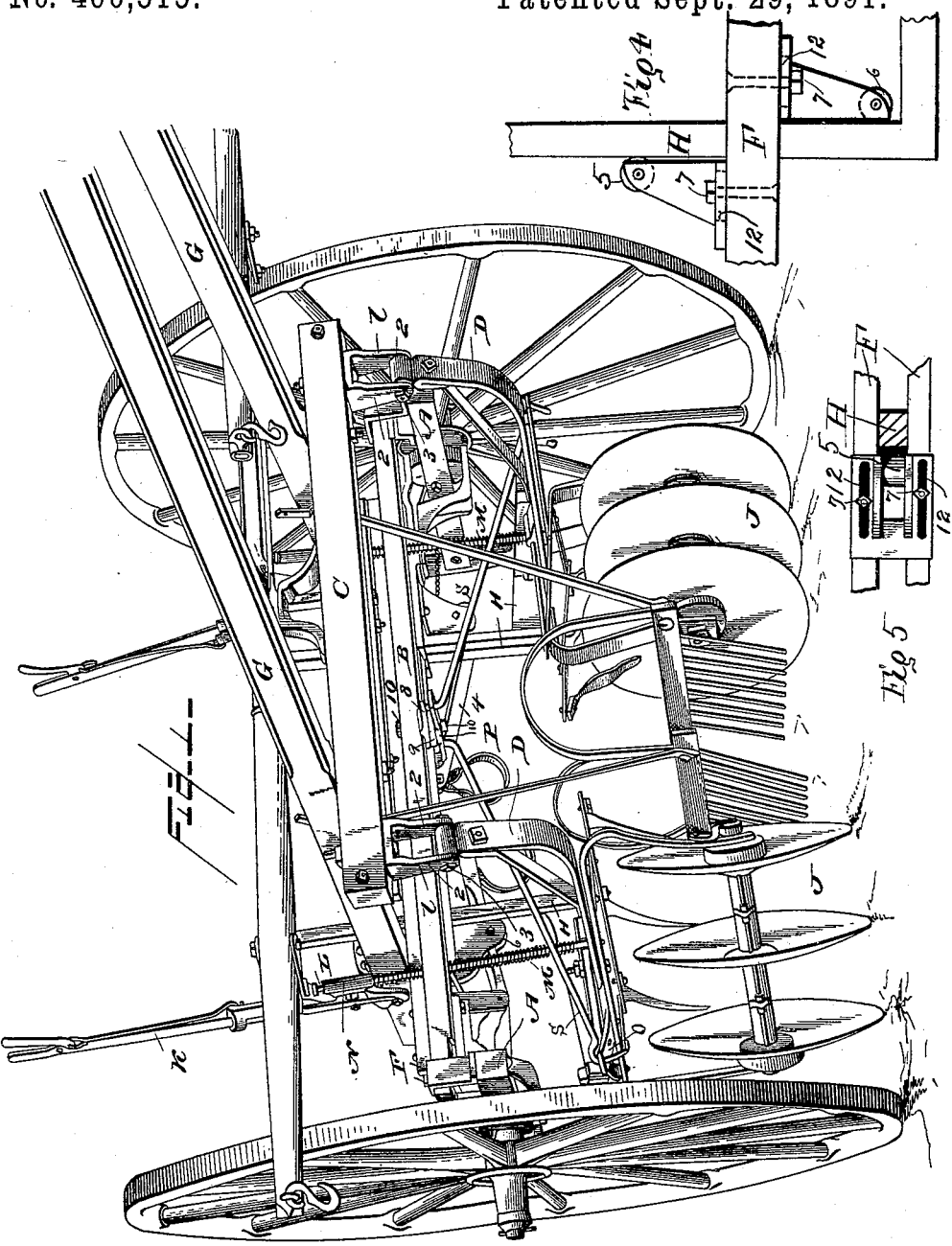
Figure 2:
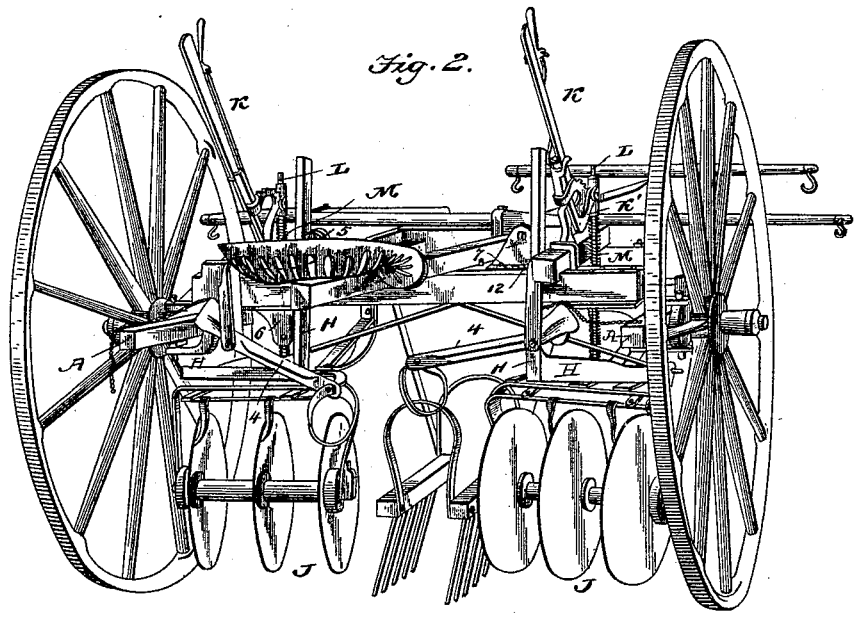
Figure 3:
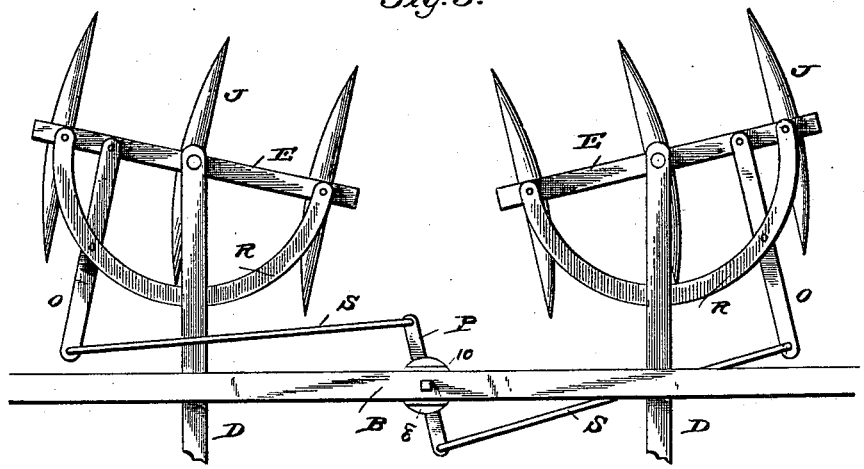

Figure 1 is a partially oblique perspective of the front of a machine embodying my invention. Fig. 2 is the same of the rear of the machine. Fig. 3 is a detail of the mode of coincidently changing and holding both gangs to any desired angle with the line of movement of the machine. Figs. 4 and 5 are detail views of the bar H and pulley attachments.

As the general construction of the implement is illustrated and described in said former Letters Patent, I do not deem it necessary to here show or describe any greater part of the same than will make intelligible the location, construction, and operation of my present improvements. The gangs being similarly attached and controlled, the description and claims will be largely of one gang.

A A are short longitudinal beams pivoted nearly centrally to the spindle of the carrying-wheels, so as to oscillate in a horizontal plane with the carrying-wheels, and mutually connected at their forward ends by the cross-beam B. An additional cross-beam C is located in front of the beam B, and in the lower surface of the beam C, to each end thereof, are pivotally connected the draw-beams D of each gang of disks. The connection aforesaid of the draw-beams D to the beam C is effected by a vertical bracket 1, attached to said beam, and having depending ears 2, between which the forward end of the beam D is pivotally seated on the transverse bolt 3, whereby the connection aforesaid is flexible in a vertical plane.

The draw-beam D is pivotally seated near its rear end on the top of the cross-plate E, which extends the length of the gang of disks, and is bent downward at its ends and suitably attached to each end of the axle of said disks, and by means of pedal-bars 4, suitably connected to the spindle of the carrying-wheels, said disks can be instantly deflected to escape irregular hills of corn, as in said former construction.

F F are cross-beams parallel with the beam C and located in the rear of the latter, and like it rigidly attached to the tongue G.

H is a right-angled arm having its vertical portion projected upward between the beams F F and its horizontal portion projected outward and suitably attached to the cross-plate E. On the upper surface of the beams F there is seated a friction-pulley 5 in contact with the inner face of the horizontal portion of arm H, and on the lower surface of beams F is seated a friction-pulley 6 in contact with the outer surface of the vertical portion of arm H. These friction-pulleys are adjusted transversely to and from the arm H by means of vertical slotted holes 12 in the brackets carrying said rollers, through which, by means of vertical bolts 7, said brackets are attached to beams F. The disk gangs can therefore be set at any desired distance from the row. It is obvious that the arms H, having no mutual connection and being free to move vertically, permit each gang to rise or to be raised independent of the other; also by shifting the friction-rollers 5 to or from the vertical part of arm H said vertical portion may be rocked or deflected toward or from a vertical line, and the positions of the horizontal portion of said arm and the disk gang connected thereto be correspondingly tilted or changed laterally, as desired, thus adjusting the depth of cut of each end of the disk gang J and regulating the amount of earth moved thereby.

In cultivating corn in the early stages of its growth it is sometimes desirable to give the disk next to the row a very slight depth of cut and drive the outer ones deeper, while in a later period the operation may preferably be reversed.

The hand-lever K is suitably fulcrumed on the frame of the machine and attached at its short arm K' to the vertical sleeve N on rod L, the lower end of which rod is suitably attached to the draw-beam D near the rear end of the latter. By this means each disk gang J can be raised or lowered and adjusted independently of the other.

M is a spring coiled about the vertical rod L and abutting at its lower end upon the center of the frame of the disks J and attached at its upper end to a movable collar N, sleeved upon the rod L, to which the short arm K' of the hand-lever K is pivotally attached. The upper end of the rod L is provided with head L', against which the sleeved collar abuts in the lifting of the gangs and by which said sleeve is prevented from escaping from the rod L. The downward pressure of the hand-lever K upon the disk gang is exerted through the spring M. Therefore when the hand-lever K is locked in position there is a continuous pressure downwardly upon the disk gangs J through the medium of the spring M, which can be graduated in proportion to the hardness of the ground, thus increasing the force upon the disk gangs beyond their own weight and at the same time making such pressure of a yielding character.

Referring to Fig. 3, and that part of my invention referring to the coincident deflection and adjustment of the disks J from the center, P is a short lever pivoted centrally transversely of and to the under surface of the cross-beam B. The junction of lever P with cross-beam B consists of a circular plate 8, seated against the lower surface of beam B, a corresponding circular surface 9, formed centrally on the upper surface of the lever P, and a vertical bolt 10, passed down through the beam B and plates 8 and 9. (See Fig. 1.) The lever P normally extends substantially in the line of movement of the machine, and by loosening the nut on bolt 10 the extremities of lever P can be moved in opposite directions, as may be desired, transversely of the machine. O is an arm rigidly attached at its rear end to the bar E, near the outer end of the latter, and also rigidly attached intermediately to the segmental brace R, near one side of the latter, and projecting forward at an altitude lower than beam B. The brace R is attached at each end to the plate E, near the ends of the latter, and is carried centrally on the draw-beam D. Rods S connect the forward end of one arm O to the front extremity of the lever P and the forward end of the opposite lever O to the rear extremity of lever P. It is obvious that in the lateral oscillation of lever P both ends thereof will move a corresponding distance toward or from the center of the machine. By said oscillation of lever P and the tightening of bolt 10 the disks J can be adjusted and held through the medium of arm O and rods S at any desired angle with the line of movement of the machine.

What I claim as my invention, and desire to secure by Letters Patent of the United States, is—

1. The combination of the disk gang J, a right-angled arm H, cross-beam F, lever K, and rod L, substantially as shown, and for the purpose described.

2. The combination of the disk gangs J, having a hinged forward connection in a vertical plane, cross-beam F, arm H, attached at its lower end to said disk gangs and projected upward through beams F, and the laterally-adjustable friction-rollers 5 and 6, seated, respectively, above or below said beam or beams on opposite sides of the vertical portion of said arm, whereby said gangs can be adjusted to or from the corn row, substantially as shown, and for the purpose described.

3. The combination of the disk gangs J, having flexible forward connections, cross-beams F, arm H, rigidly seated at its lower end on said disk gangs, and a laterally-adjustable guide on the upper or lower surface of beam F and adapted to hold the vertical part of arm H at different points in its lateral movement, whereby the angle of said disk gangs with the ground can be changed and adjusted, substantially as shown, and for the purpose described.

4. The combination of the disk gang J, flexibly connected at its forward end to the frame of the machine, arm H, attached at its lower end to said disk gang and sleeved vertically in said frame, lock-lever K, suitably fulcrumed on the frame of the machine, vertical rod L, collar N, movably seated on said rod and pivotally attached to the working end of lever K, and spring M, interposed between collar N and the upper surface of said disk gang, substantially as shown, and for the purpose described.

5. In a disk cultivator, the combination of the disk gang J, having a flexible forward connection, the arm H, rigidly attached to the upper surface of said disk gang and projected upward into or through the frame of the machine, and means, substantially as shown, for rocking the vertical portion of said arm laterally to or from a vertical position, for the purpose described.

6. In a disk cultivator, the combination of an independent disk gang, a vertical arm attached at its lower end to said gang and projected upwardly into the frame of the machine and adapted to be rocked laterally therein, and means, substantially as shown, for locking said arm at any desired point in its lateral movement, for the purpose described.

In testimony whereof I affix my signature in presence of two witnesses.

R. K. SWIFT.

Witnesses:
 JNO. G. MANAHAN,
 ADDA E. WARD.